Figure 1:
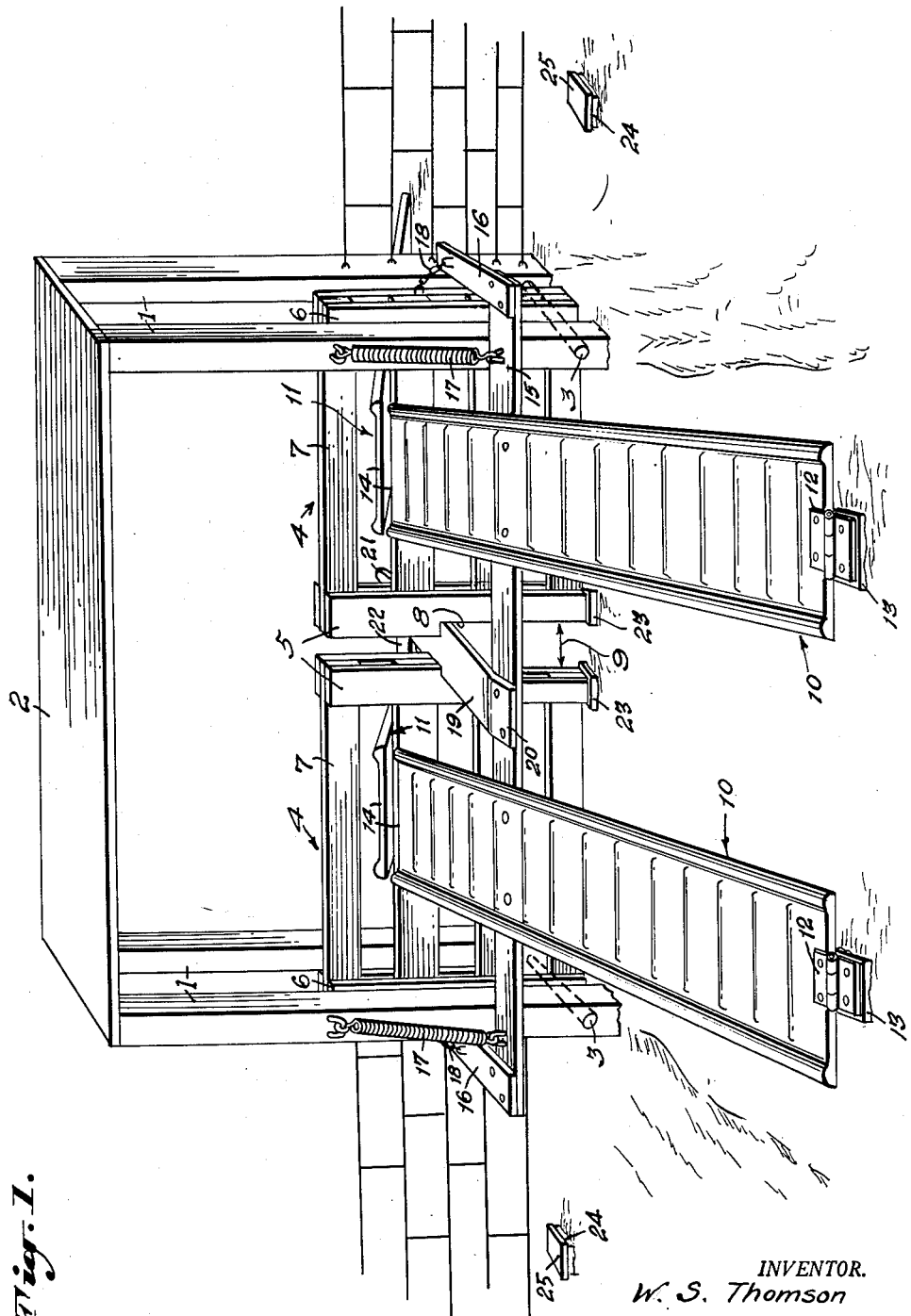

Jan. 11, 1955   W. S. THOMSON   2,699,005
VEHICLE OPERATED, TRANSVERSE HORIZONTALLY PIVOTED GATE
Filed Feb. 16, 1953   2 Sheets-Sheet 1

INVENTOR.
W. S. Thomson
BY
Henry C. Parker
Attorney.

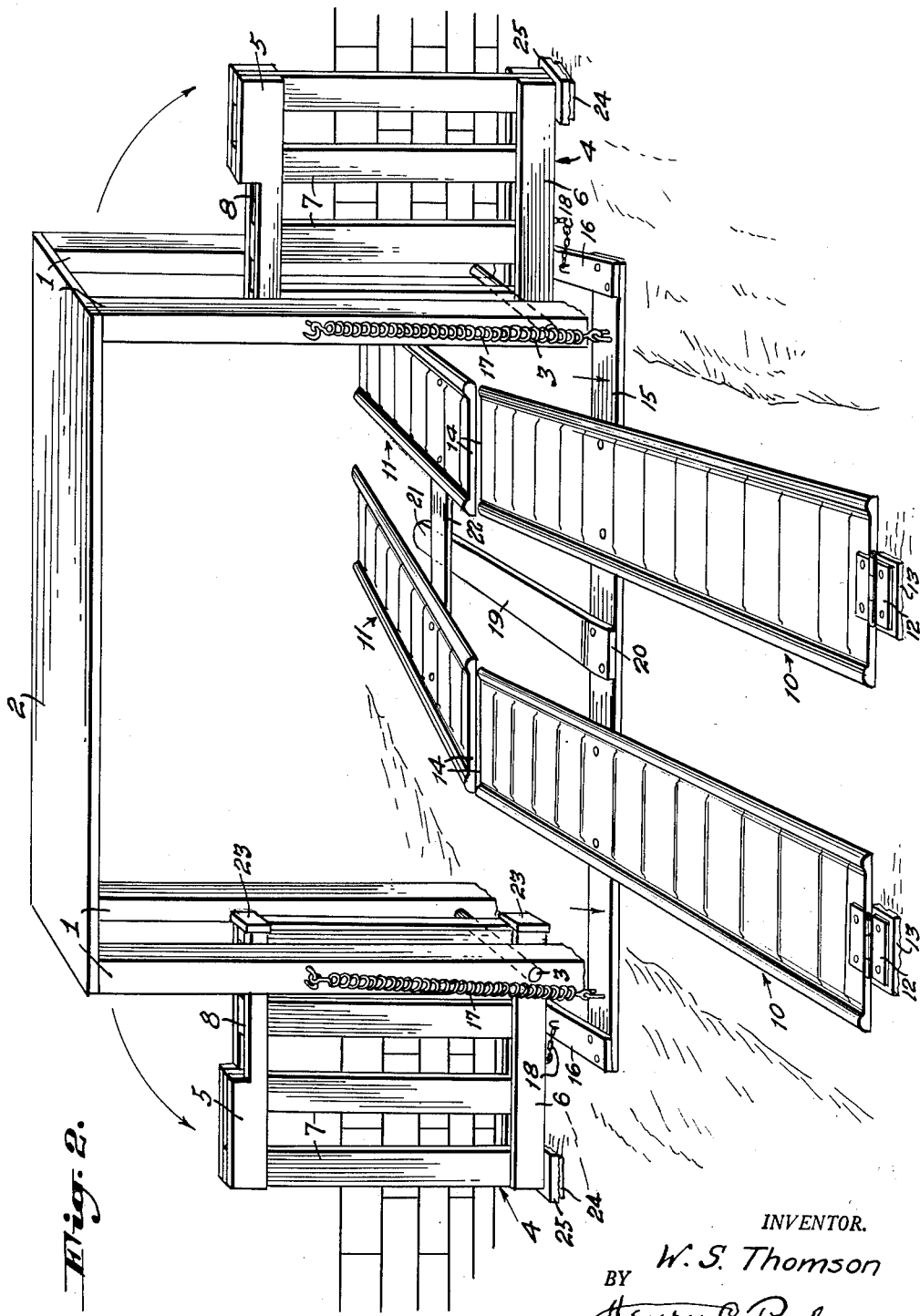

though an angle of 90° from vertical to horizontal positions. Description of the automatic operating mechanism will now be given.

United States Patent Office 2,699,005
Patented Jan. 11, 1955

2,699,005

VEHICLE OPERATED, TRANSVERSE HORIZONTALLY PIVOTED GATE

Wade S. Thomson, Clovis, N. Mex.

Application February 16, 1953, Serial No. 337,005

9 Claims. (Cl. 39—43)

My invention relates to Vehicle Operated, Transverse Horizontally Pivoted Gate; and it comprises a gateway defined by vertical standards at either side, horizontal transverse pivots mounted close to the ground on said standards, and a pair of gates normally closing said gateway pivotally mounted on said pivots at their outer lower corners so that they can be swung upwardly and outwardly in a single vertical plane through an angle of 90° to clear the gateway. The said gateway is advantageously provided with a mechanism whereby the gates are opened and closed automatically when a vehicle or pedestrian passes through the gateway, this mechanism comprising a pair of ramps one leading into and the other leading out of the gateway, said ramps being hinged at their outer ends so that their inner ends can move upwardly and downwardly just clearing the gates, means connecting the inner ends of said ramps forcing them to move in unison upwardly and downwardly, a U-shaped operating beam mounted on one of said ramps close to its inner end with the arms of the beam passing around the vertical standards of the gateway to points opposite the gates, resilient means tending to hold said operating beam and ramps in raised position, flexible connections attached between said arms and said gates so that when the beam is depressed by the passage of a vehicle the gates are caused to pivot upwardly and outwardly into their open positions resting on top of said arms, said resilient means and arms being so constructed and arranged that when the ramps and arms are raised by said resilient means after passage of the vehicle off the ramps the gates are lifted by the arms and caused to pivot back into their closed positions; all as more fully hereinafter set forth and as claimed.

Fenced enclosures of all types must be provided with gates for ease of ingress and egress. Where it is necessary to drive animals and/or vehicles into the enclosures the gates must be sufficiently wide for this purpose and become difficult to operate by hand. The danger is always present that someone passing through such gates will forget to close and lock them. The driver of a vehicle or a rider on horseback must dismount, open the gate, drive through, again dismount, close the gate and again mount. This is time consuming and annoying. While automatically operated mechanisms have been invented for opening garage and other doors, none of these is entirely suitable for opening gates. Most are too expensive to construct.

I have solved these difficulties by devising a simple and relatively inexpensive mechanical contrivance for opening the gates of a gateway upon the approach of a vehicle, a horseback rider or even a pedestrian, which is operated automatically by the weight of the vehicle, rider or pedestrian, the gates being also closed automatically after passage through the gateway. I have devised a novel gate mounting for use with my automatic operating mechanism but which has independent utility. This construction is adapted particularly to a passageway in a fence or the like where there is plenty of space on either side of the passageway but where horizontally swinging gates may be either objectionable or at least disadvantageous. The gates are mounted for pivotal motion at their outer lower corners so they can be turned up on their outer ends to clear the driveway. The pivots are secured to vertical standards close to the ground and it is advantageous to provide a pair of spaced standards at either side of the gateway with the pivots passing between each pair, the gates being hung in the spaces between the pairs of standards so that they swing through these spaces. The four standards are preferably capped by a lintel so that their relative positions will remain fixed. The so-described gates can be opened by grasping their center posts in either hand and swinging them upwardly in a single motion to make them tilt up on their ends, a much easier operation than operating a horizontally swinging gate. Another advantage is that these gates never tend to swing open of themselves even in a strong wind. To close the gates they can be grasped by the inner posts and pivoted into closed position. Gravity assists in opening and closing the gates as soon as their centers of gravity pass beyond a vertical line passing through their pivots. My gate construction is thus advantageous even without the use of my automatic opening and closing mechanism.

The means for automatically opening and closing the described gates can be operated by the weight of a vehicle or even—in the case of light gates—by the weight of a pedestrian. In this device two ramps are provided, one leading into and the other from the gateway. The ramps are hinged at their outer ends to posts driven into the ground so that their inner ends can be moved up and down just clearing the gates. To one of the ramps and close to its inner end an operating beam is mounted having the shape of a U, with its arms extending around the end standards of the gateway to points opposite the swinging gates. The ramp on which the operating beam is mounted is connected to the other ramp in such manner that their inner ends are forced to move in unison. This connection may pass around the ends of the standards or through a space provided between the gates. Springs are mounted on the standards and connected with the operating beam, these springs being sufficiently strong to hold the ramps in their raised position and also to "kick" the gates into closed position after the passage of a vehicle. The two arms of the operating beam are attached by flexible connections to the outer ends of the gates in such fashion that when the arms are depressed by a vehicle moving on to the ramp the outer ends of the gates are pulled downwardly and outwardly forcing them to tilt upwardly until they fall over on their ends on top of the said arms. This clears the gateway for the passage of the vehicle. Then after the vehicle has passed off the far ramp the springs operate to lift the two ramps and operating beam whereupon the arms of the latter force the gates to pivot until they fall by gravity into their closed position. The gateway is then ready for the passage of another vehicle in either direction. The ramps and gates can be made sufficiently light to be operated by a rider on horseback and it is not too difficult to teach a horse to ascend the near ramp and stand still while the gates open and then to walk off the far ramp. For relatively narrow gateways the gates can be made so they can be operated even by the weight of a pedestrian. Owing to the fact that the gates fall into their open and closed positions with some force, it is desirable to provide snubbers of some type to take up the shock. Posts capped with sponge rubber or the like are suitable for this purpose.

My automatic gate can be described in greater detail by reference to the accompanying drawing which shows, more or less diagrammatically, an operating embodiment thereof. In this showing, Fig. 1 is a perspective view of my gate in its closed position, while Fig. 2 is a similar view of the gate in open position, as during the passage of an auto, but without showing the latter.

In the two figures like parts are designated by like reference numerals. The gateway is defined by a pair of spaced-apart vertical posts or standards 1 at either side. These posts can be made of wood, concrete or the like. In the gateway shown in the drawing these posts are capped by a lintel 2 which assists in keeping the posts vertical and correctly spaced apart. If the posts are merely driven into the ground such a lintel should be employed. At the bottom of the pairs of posts at either side of the gateway a transverse horizontal pivot 3 is provided from which the vertically swinging gates, shown generally at 4, are hung. The gates are mounted so that they can be swung in a single vertical plane about their respective pivots through an angle of 90°. The gates themselves have a conventional construction comprising center uprights or posts 5 and end uprights 6 connected by horizontal spaced rails 7. The pivots 3 pass through the end uprights of the gates close to their lower ends as shown in the drawing. Preferably the gates are mounted so that they swing in the spaces provided between the pairs of end posts, although this is not essential. And, of course, it is not essential to provide pairs of posts at either side of the gateway, a single post being sufficient if adequately strong. The central uprights of the gates are notched or reduced in width as at 8 to provide a space 9 therebetween for a purpose which will hereafter appear.

The gateway with double gates described above can be used without any provision for automatic opening of the gates. The gates can be opened in a single motion by grasping their central uprights in either hand and swinging upwardly to tip the gates up endwise. To close them it is only necessary to pull inwardly on the ends of the central uprights until the centers of gravity of the gates are moved to the inside of the pivots at which time the weight of the gates will cause them to close. But, of course, the principal advantage of the construction so far described is that it enables the gates to be operated automatically by a vehicle passing through the gateway from either side using a very simple and fool-proof operating mechanism which will now be described.

The operating mechanism shown in the drawing comprises two opposed pivoted vehicle ramps, shown generally at 10 and 11, mounted on either side of the gateway. These ramps may be divided into two sections as shown in the drawing to reduce the amount of construction material required, in which case the sections must be connected so that they will operate as a unit. The ramps are hinged at their outer ends, the hinges 12 being advantageously secured to posts 13 driven substantially flush with the ground. When swung to their lower position, as shown in Fig. 2, the inner ends 14 of the ramps must be spaced apart a sufficient distance so they do not interfere with the swinging gates. When swung to their upper position the distance between the inner ends increases, of course. A U-shaped operating beam 15 must be secured to at least one of the ramps with its arms 16 passing around the end posts of the gateway to points opposite the swinging gates. These arms must pass beneath the swinging gates when the latter are open, as shown in Fig. 2. The structure comprising the ramp and operating beam must be provided with means for automatically raising the beam and thereby closing the gates as soon as a vehicle has passed off the ramps. One simple way of accomplishing this is to have the beam connected to the end posts of the gateway by springs 17. These springs should be sufficiently strong to raise both ramps against gravity as well as to tilt the gates into closed position but should have a rather short range of action. As these springs raise the ramp shown in the foreground of Fig. 2, the arms 16 of the operating beam in effect "kick" the gates upwardly and the latter are thereby caused to pivot into their closed position. The arms are also provided with flexible means for opening the gates when they are depressed by a vehicle. This means may take the form of chains or ropes 18 attached at one of their ends to the arms 16 and at their other ends to the outer ends of the gates in such position that, as the arms are depressed, a downward and outward pull is exerted on the outer ends of the gates resulting in tilting them upwardly on their ends through an angle of 90°, as shown in Fig. 2.

The ramp at the far end of the figures does not require a complete operating beam since the gates can be operated as a vehicle approaches this side of the gateway by means of a tongue 19 which at one end 20 is secured to the operating beam 15 while its other end 21 passes beneath an auxiliary bar 22 which connects the two sections of the far ramp. This tongue raises the far ramp when the springs 17 raise the operating beam 15 and, when the far ramp is depressed by a vehicle, the bar 22 depresses the tongue 19 which in turn depresses the operating beam 15 and operates the gates automatically so a vehicle can pass through the gateway. In the construction shown in Fig. 2 the far ramp drops of its own weight when the fore ramp is depressed but, of course, a connecting means can be used between the two ramps which forces the far ramp to move with the fore ramp as a unit. Any sliding connection between the tongue 19 and the far ramp can be used which provides a sliding action and permits a slight tilting of the tongue with respect to the ramp. The tongue 21 and bar 22 constitute a convenient means for causing the inner ends of the ingoing and outgoing ramps to be raised and lowered in unison so that the operating beam 15 is depressed by a vehicle passing up either of the ramps, i. e. passing through the gateway in either direction. It will be noted from Fig. 1 that the tongue 19 passes through the gates in the space 9 between the notches 8 on the inner uprights. The upper ends of the notches serve as a stop to limit the upward movement of the tongue whereby the height of the ramps is controlled in the closed position of the gates. The tension of the springs 17 should be so adjusted that their upward pull is substantially nil when the tongue rises to the tops of the notches 8.

Since the swinging gates operate by gravity at both ends of their travel it is necessary to provide means of some type so they do not strike the ground too hard. These means can be attached to the central uprights of the gates, as shown at 23, or they may be mounted on the top of posts which are driven into the ground, as shown at 24. It is somewhat more advantageous to have them mounted on posts driven into the ground since otherwise during wet weather the ground is likely to give way somewhat under the impact of the gate uprights. The snubbers may be provided with cushions of sponge rubber as shown at 25, Fig. 2 or dash pots can be incorporated to diminish the shock if desired.

Various modifications can be made in the specific structures which have been described without departing from the purview of this invention. A wide selection of construction materials is available for the making of my automatic gate. Wood is, of course, the cheapest and is quite satisfactory since no close tolerances are required. It is usually desirable to weather-proof the wood to reduce swelling during wet weather. The ramps and/or gates can be made of aluminum, if desired, to reduce their weight. All parts except the springs can be made of this metal. Bronze springs can be used although steel is satisfactory if provided with a protective coating. The dimensions of the gateway can be varied to a considerable extent. It can be made sufficiently wide to accommodate all types of farm equipment although it is evident that the wider the gateway the more difficult it becomes to operate the gates due to their increased weight and radius of their swing. As mentioned previously, if made relatively narrow and of light material the gates can be operated by the weight of a man walking up the ramp. This is advantageous since it is much easier for a person to walk up a ramp through an automatically opening gateway than it is to stop, unlatch a swinging gate, to pass through and then to fasten the gate again. If a one-way gate is desired, the far ramp can be omitted and the tongue 19 dispensed with. With this modification the vehicle must be driven off the inner end of the ramp rather quickly to prevent the gates from closing before the vehicle has cleared the gates. Other modifications of my invention which fall within the scope of the following claims will be immediately evident to those skilled in the art.

What I claim is:

1. An automatic double gate which comprises in combination spaced vertical standards defining a gateway, transverse horizontal pivots mounted close to the bottoms of said standards, a pair of gates having inner and outer uprights connected by horizontal rails normally closing said gateway and mounted on said pivots to swing upwardly and outwardly through 90° arcs in a single vertical plane substantially passing through said standards, said pivots being mounted at the bottoms of said outer uprights so that the gates clear the gateway when swung through said arcs, at least one ramp having inner and outer ends leading into said gateway hinged at its outer end so that its inner end swings up and down just clearing said gates, a horizontal operating beam mounted on said ramp close to its inner end and equipped with arms passing around said standards to points opposite said gates, flexible means connected between said arms and said gates in such manner that when the arms are depressed by downward movement of the inner end of said ramp the gates are caused to swing into open position resting on top of said arms, the arms being so arranged that when raised they force the gates to pivot back into closed position, and resilient means for raising said operating beam and holding it in raised position except when it is depressed during passage of a vehicle over the ramp and through said gateway.

2. A two-way automatic double gate which comprises in combination spaced vertical standards defining a gateway, transverse horizontal pivots mounted close to the lower ends of said standards, a pair of gates having inner and outer uprights pivotally mounted on said pivots at the lower ends of their outer uprights so that when pivoted upwardly and outwardly in a single vertical plane through an angle of 90° the gates clear the gateway, a pair of ramps having inner and outer ends leading into and away from said gateway, said ramps being hinged at their outer ends so that their inner ends can move up and down just clearing said gates, a horizontal operating beam mounted close to the inner end of one of said ramps having arms passing around said standards to points opposite said gates, resilient means tending to raise the operating beam and the inner end of said ramp and to hold these elements in raised position, flexible connections between the arms of said operating beam and said gates attached in such position that when the arms are depressed by a vehicle passing up said ramp the gates are swung around their pivots into open position resting on top of said arms, the arms being positioned so that when raised by said resilient means after the passage of said vehicle they force the gates to pivot back into their closed positions, and means connecting the two ramps for causing their inner ends to move upwardly and downwardly in unison so that the said operating beam is depressed by a vehicle entering the gateway by either of said ramps.

3. The gate of claim 2 wherein said means connecting the two ramps consists of a tongue mounted transversely on said operating beam and connected with the inner end of the opposite ramp by means of a sliding connection providing a slight pivotal motion, the tongue when raised tending to hold the opposite ramp in its raised position and when depressed causing the opposite ramp to assume its depressed position.

4. The construction of claim 3 wherein said tongue passes through a space provided between the two gates when the latter are in closed position.

5. The double gate of claim 2 wherein snubbers are provided to receive the impacts caused when the inner uprights of the gates reach their opened and closed positions, respectively.

6. The double gate of claim 2 wherein said resilient means tending to hold the inner ends of the ramps in their raised position comprises springs mounted on said vertical standards and connected to said operating beam.

7. The double gate of claim 2 wherein the tops of said spaced standards are capped with a lintel serving to hold the standards in spaced parallel position.

8. The double gate of claim 2 wherein a pair of spaced-apart vertical standards is provided at either side of said gateway, said pivots passing between the spaced pairs, the swinging gates being mounted to swing in the space between the pairs of standards.

9. A two-way automatic double gate which comprises in combination two pairs of vertical standards mounted at either end of a gateway, said pairs being spaced apart transversely, horizontal pivots mounted transversely at the lower ends of said pairs of standards and passing through the spaces therebetween, a pair of gates having inner and outer uprights pivotally mounted on said pivots at their lower outer corners so that when pivoted upwardly and outwardly in a vertical plane through an angle of 90° the gates swing through the spaces between the pairs of standards and clear the gateway, ramps having inner and outer ends leading into and away from the gateway, said ramps being hinged at their outer ends so that their inner ends can move up and down just clearing the gates, means connecting said inner ends forcing them to move in unison upwardly and downwardly, a U-shaped operating beam mounted horizontally close to the inner end of one of said ramps with its arms passing around said standards to points in said vertical plane, resilient means tending to hold said operating beam and said ramps in raised position, and flexible means connecting said arms to said gates in such fashion that when the arms are depressed by the passage of a vehicle up said ramp the gates are caused to pivot into their open positions resting on top of said arms, the arms being so constructed that when raised by said resilient means after the passage of said vehicle off the ramps the gates are lifted and caused to pivot back into their closed positions.

References Cited in the file of this patent

UNITED STATES PATENTS

| Number | Name | Date |
|---|---|---|
| 616,404 | Chaney | Dec. 20, 1898 |
| 1,837,941 | Baltzer | Dec. 22, 1931 |
| 2,529,386 | Guth et al. | Nov. 7, 1950 |
| 2,561,683 | Benke | July 24, 1951 |